Sept. 13, 1932.   H. A. DOUGLAS   1,876,875
AUTOMOTIVE VEHICLE SWITCHING MECHANISM
Filed Dec. 16, 1929   2 Sheets-Sheet 2
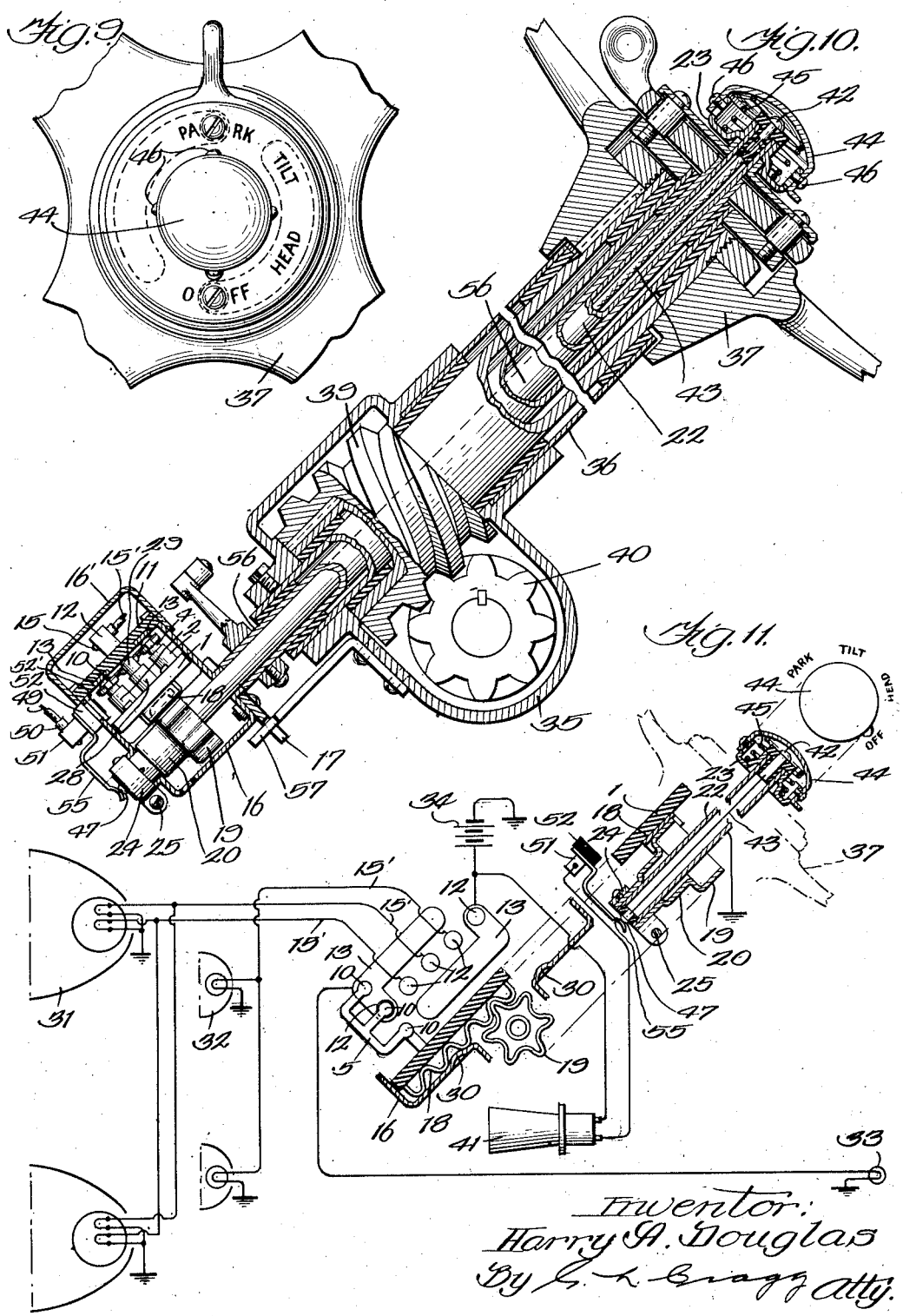

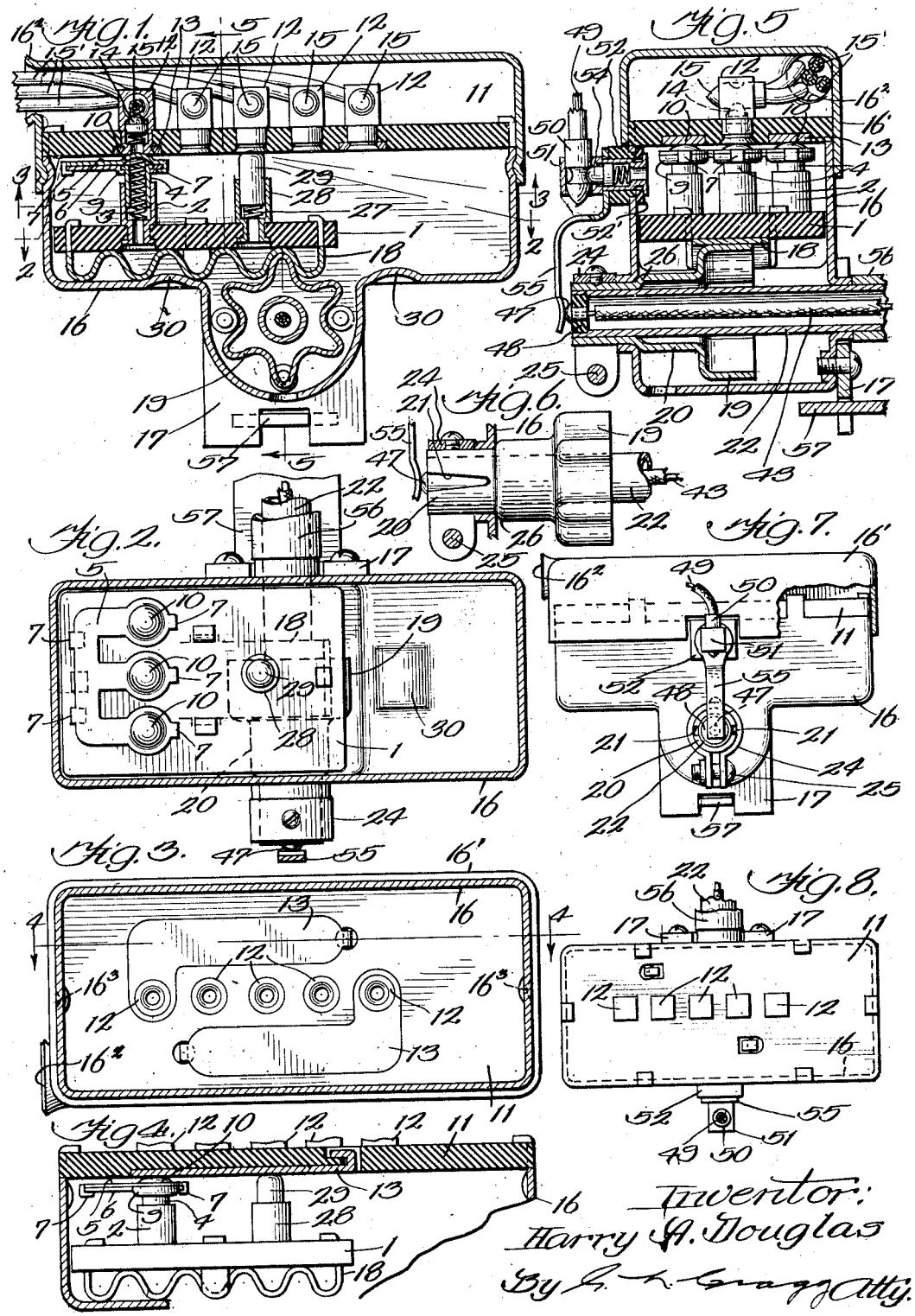

Patented Sept. 13, 1932

1,876,875

UNITED STATES PATENT OFFICE

HARRY A. DOUGLAS, OF BRONSON, MICHIGAN

AUTOMOTIVE VEHICLE SWITCHING MECHANISM

Application filed December 16, 1929. Serial No. 414,492.

My invention relates to automotive vehicles and electrical circuits associated therewith. In carrying out my invention I assemble the switching mechanism controlling the circuits of an automotive vehicle with the lower end of the stationary steering column and in a position to be free from access of foreign matter. The switching mechanism is provided with a casing and gearing within the casing for effecting the control of the switching mechanism, this gearing being coupled with a hollow operating rod or shaft that passes through the steering column to a position at the steering hand wheel where such rod may be manipulated to turn it upon its axis and thereby effect the operation of the switching mechanism. The electromagnetically operated horn is provided with a terminal that is located upon the exterior of and adjacent the switch casing in such position as to be engageable by a contact that is assembled and coaxial with said rod or shaft, this contact being exposed upon the exterior of the casing. The contact that is assembled with this rod or shaft is electrically connected with a push button contact that is mounted upon the steering hand wheel. This arrangement permits of the ready inclusion of the horn button in the push button circuit as a consequence of the assembly of the switch operating gearing within the switch casing.

In accordance with another characteristic of the invention I provide a simple assembly between the steering column and the switch casing.

I will explain my invention more fully by reference to the accompanying drawings in which Fig. 1 is a sectional view illustrating the preferred form of switching mechanism employed in the construction of my invention; Fig. 2 is a sectional view on line 2—2 of Fig. 1; Fig. 3 is a sectional view on line 3—3 of Fig. 1; Fig. 4 is a sectional view on line 4—4 of Fig. 3; Fig. 5 is a sectional view on line 5—5 of Fig. 1; Fig. 6 is a side view of some of the parts; Fig. 7 is a view in elevation; Fig. 8 is a plan view with a casing cap removed; Fig. 9 is a plan view showing some of the parts at the steering hand wheel; Fig. 10 is a view showing the assembly of the steering wheel, steering mechanism and contiguous parts, portions being broken away and portions being shown in section; and Fig. 11 is a diagrammatic illustration of one circuit arrangement to which the structure of my invention is adapted.

The switch illustrated has a member which is inclusive of a horizontally disposed insulating plate 1, spring barrels 2 assembled with this plate and projecting upwardly therefrom, a coiled spring 3 within each spring barrel, a tubular metallic member 4 also within each spring barrel and in sliding or telescopic relation thereto, each tubular member receiving the corresponding spring 3 therein and a resilient metallic contacting plate 5, which is fixedly secured to all of the tubular members 4 by means of a metallic assembling plate 6 to which the plate 5 is clinched, as indicated at 7. Each tubular member 4 is provided with a flange 8 which is interposed between the plates 5 and 6 and is clamped in place by means of the shoulder 9 which holds the flange against the plate 5. The plate 5 is upwardly bulged at each place thereof that is in alignment with the parts 2, 3 and 4, as indicated at 10, these bulging portions constituting contacting parts. The plates 5 and 6 are of similar fork shape, one plate being placed upon and in register with the other. These plates 5 and 6 are of spring metal, preferably brass, so that the branches of the fork are relatively flexible to permit the contacts 10 to ride over parts engaged thereby, in the operation of the switch, the contacts 10 thus shaping themselves to noncoplanar parts engaged thereby without danger of separating these contacts from parts which they should engage. The other switch member is inclusive of another insulating plate 11, metallic spring barrels 12 mounted upon and projecting upwardly from the plate 11 and metallic contacting bars 13 which are mechanically and electrically united with the two end spring barrels 12. The bars 13 are received within recesses formed within the bottom side of the plate 11. The upwardly spring pressed contacts 14 are received within the barrels 12 and project into the spaces in the enlarged upper ends or extensions of the barrels 12 that receive the metallic terminal plugs 15, which are engaged by the contacts 14.

The bottom ends of the spring barrels 12 are formed with cavities which are adapted to receive the contacts 10, as will later more fully appear. The insulating plate 1 and the parts thereon are rectilineally movable to bring the contacts 10 into and out of engagement with the barrels 12. These contacts, being upon the outer ends of the branches of the fork shaped member, are adapted to rise and fall relatively as they move into and out of engagement with the barrels 12 that thus constitute contacts complemental to the contacts 10. These contacts are arranged in a straight row and the barrel contacts 12 are also arranged in a straight row, the two rows being in similar direction and in lapping relation. One of the bars 13 may constitute a tail light terminal and the other a battery terminal, the intervening spring barrels constituting head light, dimming and parking light contacts all diagrammatically indicated in Fig. 11.

The switch illustrated may be provided with a casing 16 of which the insulating plate 11 constitutes a closure. This casing encloses the plate 1 and the parts assembled therewith, but leaving the upper ends or extensions of the spring barrels 12 upon the exterior of the casing. I provide a cap 16' for the casing, as a whole, this cap serving to protect the upper ends of the spring barrels 12 and the plugs 15 that are received in these spring barrel ends. The conductors 15' which extend between the plugs 15 and the parts whose circuit associations are to be governed by these plugs are passed through an opening 16² formed in the cap 16'. The cap has groove and spring tongue assembly with the body of the casing 16 as indicated at 16³.

The assembling ear 17 is secured to the casing and serves to hold the same in suitable relation to the steering gear housing that is assembled with the steering column, as will more fully appear.

The mechanism for moving the movable switch member is desirably inclusive of a rack 18 that is formed of a strip of metal which is sinuously curved to form the rack teeth. This rack is desirably carried by the plate 1. A pinion 19 is in mesh with the rack. The casing 16 also encloses said gear elements. A tubular hub 20, formed of resilient metal, is notched, as indicated at 21, to make it contractible. The switch operating rod or shaft 22 extends across the casing 16. Said shaft is provided with a suitable operating means such as the lever 23 and is passed through an opening, which is formed in the casing 16 and into the hub. A clamping collar 24 embraces the hub and clamps it into engagement with the shaft to prevent outward movement of the shaft. This clamping collar is equipped with a suitable clamping screw 25. Inward movement of the shaft is prevented by the engagement of the hub enlargement 26 with the inner side of the casing 16. The gear 19 is thus confined to a fixed plane of rotation. In order that the pinion may be readily assembled the combined axial length thereof together with its hub is less than the space between the side walls of the casing 16, so that said hub may be dropped into alignment with an opening in the casing that receives it, when the insulating plate 11 is not in position. The portions of the casing through which the hub 20 passes are laterally deflected and extended as illustrated in Fig. 5 to form bearings for the hub 20 and shaft 22.

The springs in the barrel 2 take part in leveling the plate 1. An additional leveling spring 27 is interposed between and presses upon both of the switch members, the spring 27 being retained within a spring barrel 28 which is assembled with the insulating plate 1. A plunger 29 is telescopically received within the spring barrel 28 and is pressed against the insulating plate 11, or the contacting ends of the spring barrels 12, according to the position in which the plate 1 is placed upon its rectilineal movement that is caused by rotation of the pinion 19. The spring 27 and the parts through which it exerts its pressure are mounted apart from the contacts 10, that is upon one side of this row of contacts, so that it readily cooperates with the springs 3 in the barrels 2 to maintain the plate 1 level throughout the entire range of rectilineal movement thereof.

The cavities in the bottom faces of the barrels 12 serve to hold the plate 1 and the parts thereon in position when the current conducting contacts are in engagement. Detents 30, which are desirably inwardly bulged portions of the casing 16, enter spaces between the rack teeth to hold the plate 1 in position when the switch is in circuit opening adjustment. These detents may also take part in holding the plate 1 in position when the switch is in circuit closing adjustment.

The conductors 15' respectively extend to the main and tilting filaments of the head lamps 31, the parking lamps 32, the tail lamp 33 and the battery 34 all as indicated most clearly in Fig. 11. The supporting brackets 17 for the switch casing 16 are carried upon the steering gear casing 35 in such a manner as to place the closure plate 11 of the casing 16 uppermost, whereby the switch contacts are located above the pinion 19 and the bottom of the casing so as to be relieved of the material access of foreign matter thereto.

The rod or shaft 22 is coaxial with the inclined stationary steering column 36. The steering hand wheel 37 is also coaxial with the steering column being mounted thereabove. This steering hand wheel is coupled with a hollow shaft 38 which carries the worm gear 39 that is in mesh with the pinion 40 which is in suitable guiding relation to the steering vehicle wheels, in the case of a land vehicle or other steering means in the cases of other vehicles. The rod or shaft 22 terminates at the top side of the hand wheel 37 and is there coupled with the lever 23 which is upon the top side of the steering wheel 37.

The electromagnetically operated horn 41 has one terminal grounded through the battery 34 and has its other terminal connected with a contact 42 which is carried by and insulated from the hollow shaft or rod 22, a conductor 43, taking part in connecting the contact 42 with the horn, passing through the hollow shaft 22. A push button 44 is provided upon the top side of the wheel 37 to be engageable with the contact 42 from which it is normally spaced apart by the coiled spring 45. The push button 44 may also be employed to turn the lever 23 to turn the pinion 19. To this end the push button may carry pins 46 which extend into slots that are formed in the lever 23 lengthwise of the shaft 22, an assembly which permits the push button to be operated to sound the horn without actuating the shaft 22 and to be turned, to turn said shaft, without operating the horn. The lower end of the conductor 43 is assembled with a contact 47 which is carried in the insulating closure or contact carrier 48 that is carried by the hollow shaft 22 and serves as a closure therefor. A flexible conductor 49 extends from the horn and terminates in a plug 50. This plug is receivable within an opening formed in the outer end of a spring barrel or circuit connector 51 which passes through the casing 16 and is assembled therewith by two opposed insulating discs 52 which are clamped between shoulders upon said spring barrel and which discs clamp the adjacent portion of the casing 16 therebetween. A coiled spring 53 is located within the spring barrel 51 and presses outwardly upon the plunger contact 54 to engage this contact with the inserted plug 50. A leaf spring 55 is clamped between the disc 52 and a contiguous shoulder upon the spring barrel 51. The unmounted end of this spring is in lapping relation to the contact 47 and engages this contact to include the horn in connection with the contact 42. The spring barrel 51 and parts intermediately assembled therewith are sufficiently above the region of the lower end of the shaft 22 as to be free of the accumulation of foreign matter. The contacts 47 and 55 are in rubbing relation, so that their metal engaging surfaces are kept bright for a good conductivity. This arrangement permits the shaft 22 to pass entirely through the casing 16 and to locate the contact 47 upon the exterior of the casing where it is engaged by the contact 55.

I rely upon the rod 22 as a mounting for the switch casing and parts within the casing, the clamping collar 24 serving to prevent movement of the casing downwardly on said shaft and the hollow steering rod 56 preventing movement of the casing upwardly along the shaft, this hollow steering rod being continued downwardly to engage the casing. To prevent the casing from being turned on the shaft 22, I provide a finger 57 upon the gear casing 35, this finger engaging the ears 17 for the purpose stated.

Changes may be made without departing from the invention.

Having thus described my invention, I claim:

1. The combination with a hollow rotatable shaft for operating switching mechanism of an automotive vehicle; of a casing for the switching mechanism, said shaft extending through the casing; a contacting element located in the region of the lower end of the hollow switch operating shaft; an insulated contact assembled with this shaft in a position to be engaged upon the exterior of the casing and engaged by the aforesaid contacting element; and a conductor connected with and extending from the contact that is assembled with the switch operating shaft and extending through this shaft to the upper end thereof.

2. The structure of claim 1 wherein the contact that engages the contact that is assembled with the shaft is anchored in place by a spring barrel which is secured to the casing, this spring barrel having a spring pressed contact entering a plug receiving space in the barrel.

3. The structure of claim 1 wherein the contact that engages the contact that is assembled with the shaft is in the form of a leaf spring which is anchored upon the switch casing.

4. The structure of claim 1 wherein the contact that engages the contact that is assembled with the shaft is anchored in place by a spring barrel which is secured to the casing, this spring barrel having a spring pressed contact entering a plug receiving space in the barrel, and wherein the contact that engages the contact that is assembled with the shaft is in the form of a leaf spring.

5. The combination with a steering column of an automotive vehicle; of switching mechanism assembled with the steering column at the lower end of said column; a hollow shaft passing through the steering column and having an operating lever whereby this shaft may be turned, this shaft being in actuating relation with the switching mechanism; a casing for the switching mechanism supported by said shaft which is rotatable with respect thereto; means for preventing movement of the casing longitudinally of said shaft; and means upon the steering column in holding engagement with the casing to prevent the casing from turning upon the shaft.

6. The combination with a steering column of an automotive vehicle; of rectilineally movable switching mechanism assembled with the steering column at the lower end of said column; a hollow shaft passing through the steering column and having an operating lever whereby this shaft may be turned, this shaft being in actuating relation with the switching mechanism; a casing for the switching mechanism supported by said shaft which is rotatable with respect thereto; means for preventing movement of the casing longitudinally of said shaft; and means upon the steering column in holding engagement with the casing to prevent the casing from turning upon the shaft.

7. The structure of claim 6 wherein interengaging ear and finger formations are provided upon the casing and steering column to prevent the casing from turning.

In witness whereof, I hereunto subscribe my name.

HARRY A. DOUGLAS.